United States Patent
Sathe et al.

(10) Patent No.: US 9,449,420 B2
(45) Date of Patent: *Sep. 20, 2016

(54) REDUCING THE DOMAIN SHADER/TESSELLATOR INVOCATIONS

(75) Inventors: Rahul P. Sathe, Emeryville, CA (US); Tim Foley, Concord, CA (US)

(73) Assignee: Intel Corporation, Santa Clara, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 13/992,966

(22) PCT Filed: Dec. 30, 2011

(86) PCT No.: PCT/US2011/068076
§ 371 (c)(1),
(2), (4) Date: Jun. 10, 2013

(87) PCT Pub. No.: WO2013/101177
PCT Pub. Date: Jul. 4, 2013

(65) Prior Publication Data
US 2014/0198120 A1 Jul. 17, 2014

(51) Int. Cl.
G06F 12/02 (2006.01)
G06T 15/00 (2011.01)
G06T 1/60 (2006.01)
G06T 17/20 (2006.01)

(52) U.S. Cl.
CPC .............. *G06T 15/005* (2013.01); *G06T 1/60* (2013.01); *G06T 17/20* (2013.01)

(58) Field of Classification Search
None
See application file for complete search history.

(56) References Cited

U.S. PATENT DOCUMENTS

| 6,707,452 | B1* | 3/2004 | Veach ..................... 345/423 |
| 7,038,692 | B1* | 5/2006 | Priem ................. G06T 15/005 345/503 |
| 8,144,147 | B2 | 3/2012 | Munkberg |
| 8,384,715 | B2 | 2/2013 | Loop |
| 8,482,560 | B2 | 7/2013 | Sathe |
| 2007/0088915 | A1* | 4/2007 | Archambault ........ G06F 8/4442 711/137 |
| 2010/0164954 | A1 | 7/2010 | Sathe et al. |
| 2010/0259540 | A1 | 10/2010 | Loop et al. |
| 2011/0026734 | A1 | 2/2011 | Hetherington et al. |
| 2011/0080405 | A1 | 4/2011 | Moreton et al. |
| 2011/0216068 | A1* | 9/2011 | Sathe ..................... G06T 17/20 345/441 |
| 2011/0267346 | A1* | 11/2011 | Howson ..................... 345/423 |

OTHER PUBLICATIONS

Tianyun Ni, "Efficient Substitutes for Subdivision Surfaces in Feature-quality Games", Dec. 18, 2010, ACM, Proceedings of SA '10 ACM SIGGRAPH ASIA 2010 Courses, Article No. 8.*
Alex Vlachos, Jorg Peters, Chas Boyd, Jason L. Mitchell, "Curved PN Triangles", Mar. 21, 2001, ACM, I3D'01 Proceedings of the 2001 Symposium on Interactive 3D Graphics, pp. 159-166.*

(Continued)

*Primary Examiner* — Robert Bader
(74) *Attorney, Agent, or Firm* — Trop Pruner & Hu, P.C.

(57) ABSTRACT

In accordance with some embodiments, domain shader and/or tessellator operations can be eliminated when they are redundant. By using a corner cache, a check can determine whether a given corner, be it a vertex or a quadrilateral corner, has already been evaluated in the domain shader and/or tessellator and if so, the result of the previous operation can be reused instead of performing unnecessary invocations that may increase power consumption or reduce speed.

15 Claims, 4 Drawing Sheets

(56) References Cited

OTHER PUBLICATIONS

A. Myles, T. Ni, J. Peters, "Fast Parallel Construction of Smooth Surfaces from Meshes with Tri/Quad/Pent Facets", Jul. 2008, The Eurographics Association, Computer Graphics Forum, vol. 27, Issue 5, pp. 1365-1372.*

T. Ni Y. Yeo, A. Myles, V. Goel, J. Peters, "GPU Smoothing of Quad Meshes", Jun. 6, 2008, IEEE, IEEE International Conference on Shape Modeling and Applications, 2008, pp. 3-9.*

Charles Loop, Scott Schaefer, Tianyun Ni, Ignacio Castano, "Approximating Subdivision Surfaces with Gregory Patches for Hardware Tessellation", Dec. 2009, ACM, ACM Transactions on Graphics, vol. 28, No. 5, Article 151.*

William J. Schroeder, Francois Bertel, Mathieu Malaterre, David Thompson, Philippe P. Pebay, Robert O'Barak, Saurabh Tendulkar, "Framework for Visualizing Higher-Order Basis Functions", Oct. 28, 2005, IEEE, IEEE Visualization 2005, pp. 43-50.*

PCT International Search Report and Written Opinion issued in corresponding PCT/US2011/068076 dated Sep. 17, 2012 (11 pages).

Taiwan Office Action for corresponding TW patent application No. 101150124 dated Sep. 26, 2014 (w/English translation) (7 pages).

Taiwan IPO Search Report issued in corresponding TW patent application No. 101150124 dated Sep. 18, 2014 [w/English translation) (2 pages).

Taiwan Office Action for corresponding TW patent application No. 101150124 dated Mar. 28, 2016 (w/English translation) (6 pages).

* cited by examiner

REDUCING THE DOMAIN SHADER/TESSELLATOR INVOCATIONS

BACKGROUND

This relates generally to graphics processing.

In graphics processing a pipeline is implemented in which a series of steps are performed on so-called vertices or corners. Primitives may be used to represent a surface being graphically rendered.

Tesselation is the process of subdividing a surface to be graphically depicted into smaller shapes. Tesselation breaks down the surface of an object into manageable triangles.

A Domain shader calculates the properties of each vertex of a subdivided output patch. The domain shader receives the hull shader output control points and the tesselator stage output domain locations and outputs a vertex position.

The hull shader is invoked once per patch and transforms input control points into output control points that make up a patch. It does some per patch calculations to provide data for the tessellation stage and the domain shader.

The term domain shader is generally associated with the DirectX pipeline. Essentially the same function is performed in other application program interfaces used for graphic processing including OpenGL which commonly refers to the DirectX domain shader as a tessellator evaluation shader. In OpenGL, the hull shader is often called the tessellator control shader.

DETAILED DESCRIPTION

In accordance with some embodiments, domain shader and/or tessellator redundant operations can be eliminated. By using a corner cache, a check can determine whether a given corner (be it a triangle or a quadrilateral corner), has already been evaluated in the domain shader and/or tessellator. If so, the result of the previous operation can be reused instead of doing unnecessary operation which may increase power consumption and/or reduce speed.

In the following discussion, DirectX application program interface (API) terminology is generally used. In all cases, corresponding structures may be found in other application program interfaces including OpenGL. In particular, references to a domain shader is applicable to the tessellator evaluation shader in OpenGL and references to the hull shader has applicability to the tessellator Control Shader in OpenGL. Thus the discussion that follows is applicable to any application program interface used for graphics processing.

A control cage is a low resolution model used by artists to generate smooth surfaces. By providing a higher degree of tessellation, the level of graphical detail that can be depicted is greater. However processing speed may be adversely affected by greater degrees of tessellation.

A patch is a basic unit at a coarse level describing a control cage for a surface. The surface can be any surface that can be described as a parametric function.

Figure 1:
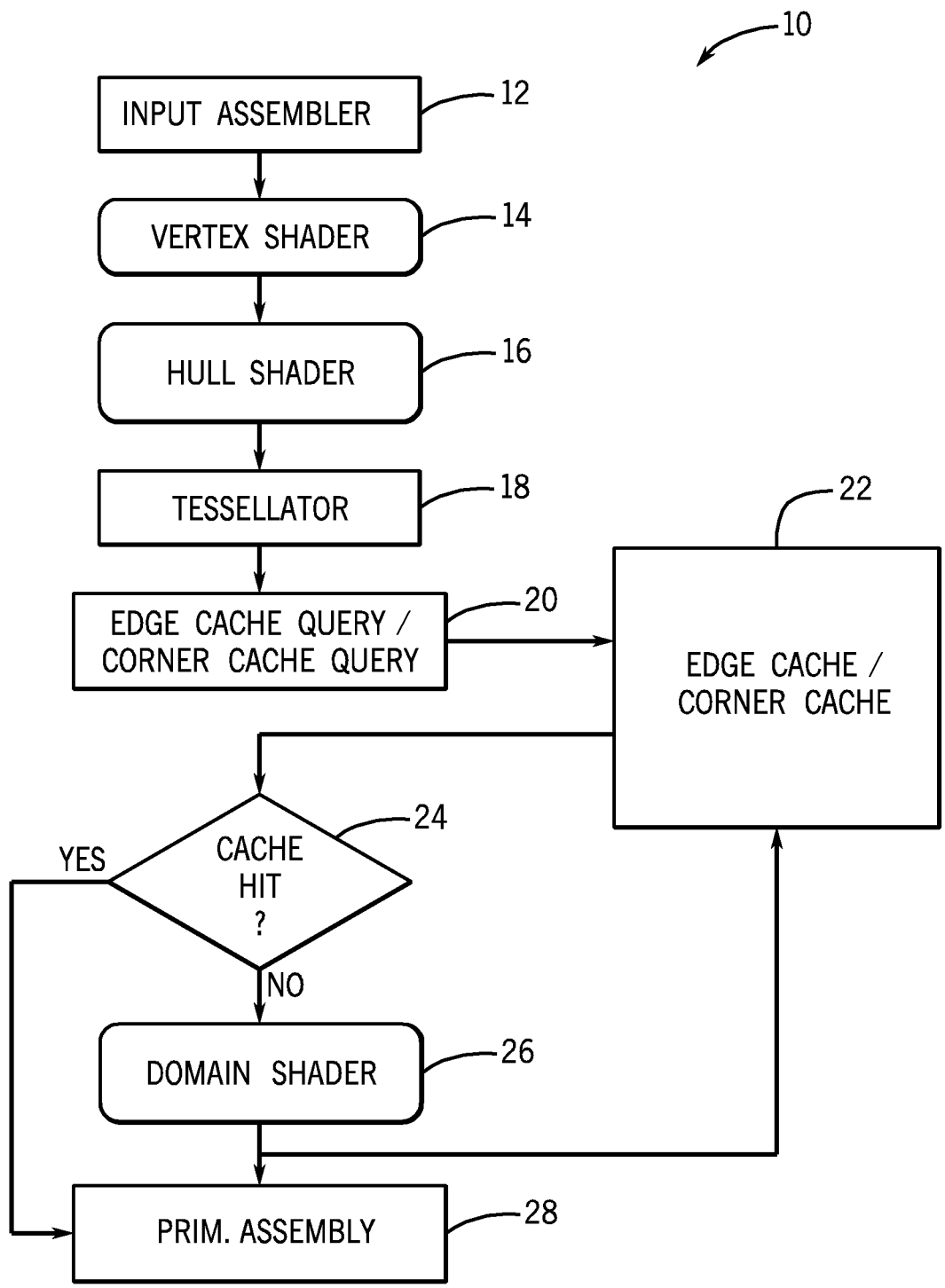
FIG. 1 is a schematic depiction of a graphics pipeline in accordance with one embodiment.

The graphics pipeline 10 shown in FIG. 1 may be implemented in a graphics processor as a stand-alone, dedicated integrated circuit, or software, through software implemented general purpose processors, or by combinations of software and hardware. In some embodiments, elements depicted in FIG. 1 with right angle edges can be implemented in hardware and elements depicted in FIG. 1 with rounded edges can be in software.

The graphics pipeline may be implemented for example in a wireless telephone, a mobile hand-held computing device that incorporates a wired or wireless communication device or any computer. The graphics pipeline may provide images or video for display to a display device. Various techniques can be used to process images provided to the display.

The input assembler 12 reads vertices out of memory using fixed function operations, forming geometry, and creating pipeline work items. Automatically generated identifiers enable identifier-specific processing. Vertex identifiers and instance identifiers are available from the vertex shader 14 onward. Primitive identifiers are available from the hull shader 16 onward. The control point identifiers are available in the hull shader 16.

The vertex shader performs operations such as transformation, skinning or lighting. It may input one vertex and output one vertex. The control point phase is invoked per output control point and each identified by a control point identifier.

The hull shader 16 control-point phase outputs one control point per invocation. The aggregate output is a shared input to the next hull shader phase and to the domain shader 26. Patch constant phases may be invoked once per patch with shared read input of all input and output control points. The hull shader 16 outputs edge tessellation factors and other patch constant data. As used herein, edge tessellation factor and edge level of detail with a number of intervals per edge of the primitive domain may be used interchangeably. Codes are segmented so that independent work can be done with parallel finishing with a join step at the end.

The tessellator 18 may be implemented in hardware or in software. In some advantageous embodiments, the tessellator may be a software implemented tessellator. The tessellator 18 retrieves encoded domain points or (u, v, w) values. A tessellator 18 may receive, from the hull shader, numbers defining how much to tessellate. The tessellator 18 generates topologies, such as points, lines or triangles. Tessellator 18 may output domain locations.

The domain shader 24 is a programmable stage that uses the domain point's (u, v, w) values, supplied by the tessellator 18 to generate a real three-dimensional vertex on a patch. The domain shader 26 evaluates vertex positions and attributes and optionally displaces the points by looking up displacement maps. The domain shader 26 may evaluate a vertex's normal and other attributes using (u, v, w) values from the tessellator 18. High frequency detail of the patch can be added using a displacement map. In some embodiments, the domain shader 26 may be software implemented.

The domain shader 26 may displace a point using a scalar displacement map or calculate other vertex attributes. In some cases, the vertex evaluations may involve the determination of a bi-cubic polynomial (or higher ordered polynomial in general) for positions, calculating partial derivatives or evaluating the tangent and bi-tangent using auxiliary tangent and bi-tangent control cages and taking their cross products, performing a textured lookup with some filtering such as linear filtering, displacing a point along a normal in the case of scalar value displacements, and displacing a point along the directions that could potentially be read from other texture ease in the case of vector value displacements.

The primitive assembler 28 assembles the resulting primitives and provides the assembled primitives to later stages of the pipeline that, in turn, provide fixed function target rendering, blending, depth and stencil operations.

In some embodiments, the hull shader 16 outputs three or four additional 32-bit identifiers packed contiguously to form an array. Three outputs may be used in the case of triangles and four outputs may be needed in the case of quadrilaterals. The array identifies the output corners of an output patch uniquely. Before launching the domain shader invocations for the corners, the pipeline queries a corner cache 22 using corresponding corner identifiers. If the pipeline does not find an entry corresponding to that corner, that corner's domain shader gets evaluated. After the domain shader's evaluation is complete, the system caches the output of the domain shader for that corner and tags it using the corresponding corner identifier.

Conversely if the system finds an entry for a particular corner identifier, it uses the cached values instead of evaluating a domain shader invocation for that corner. Thus for each triangle or quadrilateral patch, up to three or four entries may be created corresponding to three or four corners.

The corner cache may be flushed between draw calls. In aggressive implementations, one can give the control when one to flush the cache to the user, and thus the user can cache the values across draw calls. This scenario may help in the situation where a single mesh has multiple types of patches, such as regular and extraordinary patches, and there is one draw call corresponding to each type of patch for maximal single instruction multiple data (SIMD) utilization.

In some embodiments, an edge cache and a corner cache may be provided separately in block 22. The edge cache may do the same thing as the corner cache, namely avoiding unnecessary invocations of the domain shader and/or the tessellator, for edges that have already been previously evaluated.

However, it may be advantageous to have separate corner and edge caches because the flushing cycles for corners and edges are different. For example, an edge can only be used twice because only two adjacent patches would have one common edge. However, a corner typically may be used as many as six times in the case of triangular patches and thus the number of flushes may be significantly different for corners and edges and the flushing operation may need separate programming in some embodiments.

The pipeline 10 may be cycled for one patch at a time. For each patch, three or four corners or vertices are evaluated and up to four edges may be evaluated. Thus, in the one embodiment eight parallel inquiries are made from the edge cache query/corner cache query 20 to the edge cache/corner cache 22. The corner cache can be queried for each of the four corners of an output control cage and at the same time the four edges of the output control cage can be queried to the edge cache.

If a given edge or corner is found in the edge cache/corner cache 22, a cache hit is detected at diamond 24. In this case, the domain shader invocation may be avoided, saving cycles, and possibly in some embodiments improving speed and/or power consumption. If there is no cache hit, then the domain shader invocation is undertaken and, as indicated by the arrow B, the missing edge or corner entry is added to the corner or edge cache as the case may be.

Flushing of the edge cache/corner cache may be done internally within the cache 22. Each time an edge is found to have been reused, it may be flushed. One way of flushing the entry is simply to mark it as available for reuse to hold other data. However, in the case of corner caches, each time the corners is used, it would not be flushed. Instead, it could only be flushed after having been reused the probable number of times. Thus, with rectangular patches and rectangular neighborhoods, each corner could be flushed after reuse three times. With triangular patches in triangular neighborhoods, flushing may occur after reusing five times. This number of allowed reuses can be tuned empirically by simulating realistic workloads, instead of setting it to some fixed number.

Figure 2:
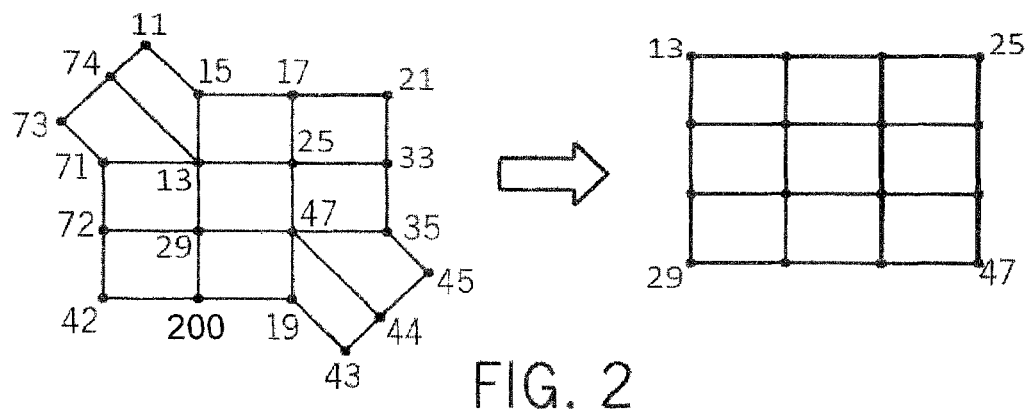
FIG. 2 shows a hull shader input control cage on the left and a hull shader output control cage on the right according to one embodiment.

An example of an input patch and its one ring neighborhood is shown in FIG. 2 with numbered corners 11, 13, 15, 17, 21, 33, 25, 47, 35, 45, 44, 47, 43, 19, 200, 29, 42, 71, 72, 73, and 74. The patch is defined by the corners 13, 25, 47, and 18. Its one ring neighborhood is made up of all the patches that surround a given patch. Thus the corner 14 may be reused in the ensuing patch 13, 29, 72, 71, in the patch 13, 74, 73, 71, in the patch 14, 13, 11, 74 and in the patch 13, 15, 17, and 25. The input control patch shown in FIG. 2 on the left is then converted by the hull shader into an output control patch shown on the right.

Figure 3:
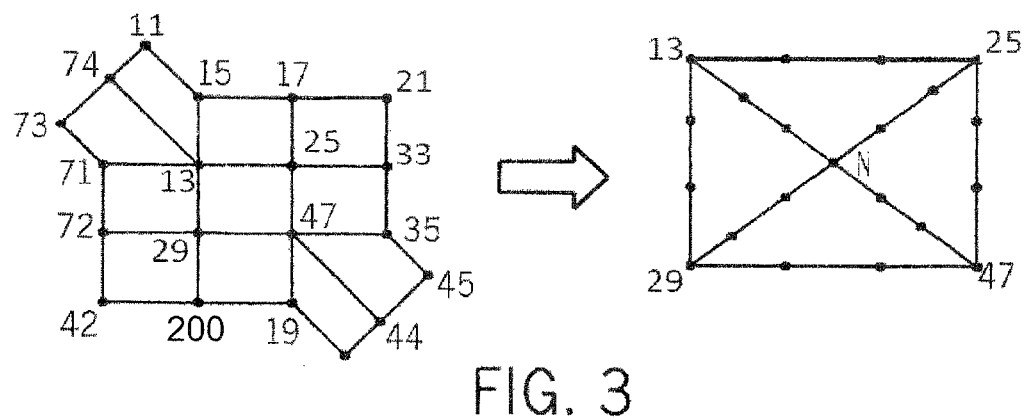
FIG. 3 shows an input control cage on the left which is the same as the input control cage shown in FIG. 2 but shows a different output control cage.

In the case of FIG. 2, no new vertices or corners are generated. However in FIG. 3, showing the same input patch, a different output patch is formed made up of four triangles having a new corner marked N.

The new corner may be given a unique identifier using an appropriate numbering scheme that does not duplicate existing corner numbers. The same number must be used for each of the four successive generations of the four triangles that make up the output patch having the common corner N. So the left most patch made up of the quad 13, 25, 47 and 29 is submitted four times. Each time it is submitted one of the four triangles is generated but the same identifier is used for the center corner for each triangle.

The operations described above in association with the domain shader can also be done for the tessellator 18. In other words, a cache 22 may simply be queried by a query 20 before the tessellator 18 stage so that the tessellator 18 stage may be bypassed to save cycles in appropriate cores.

Figure 4:
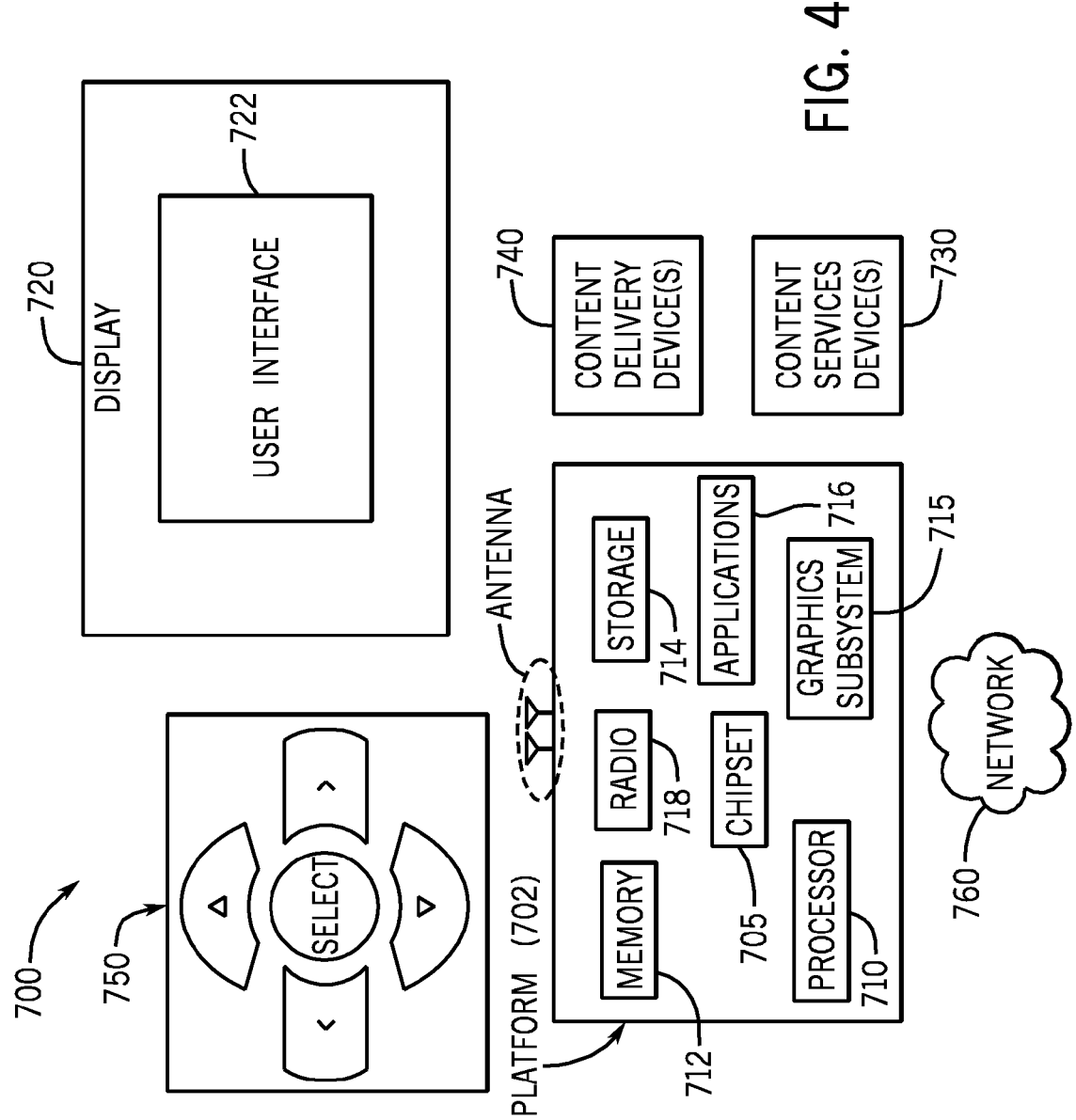
FIG. 4 is a schematic depiction of a processor-based system according to one embodiment.

FIG. 4 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/ or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
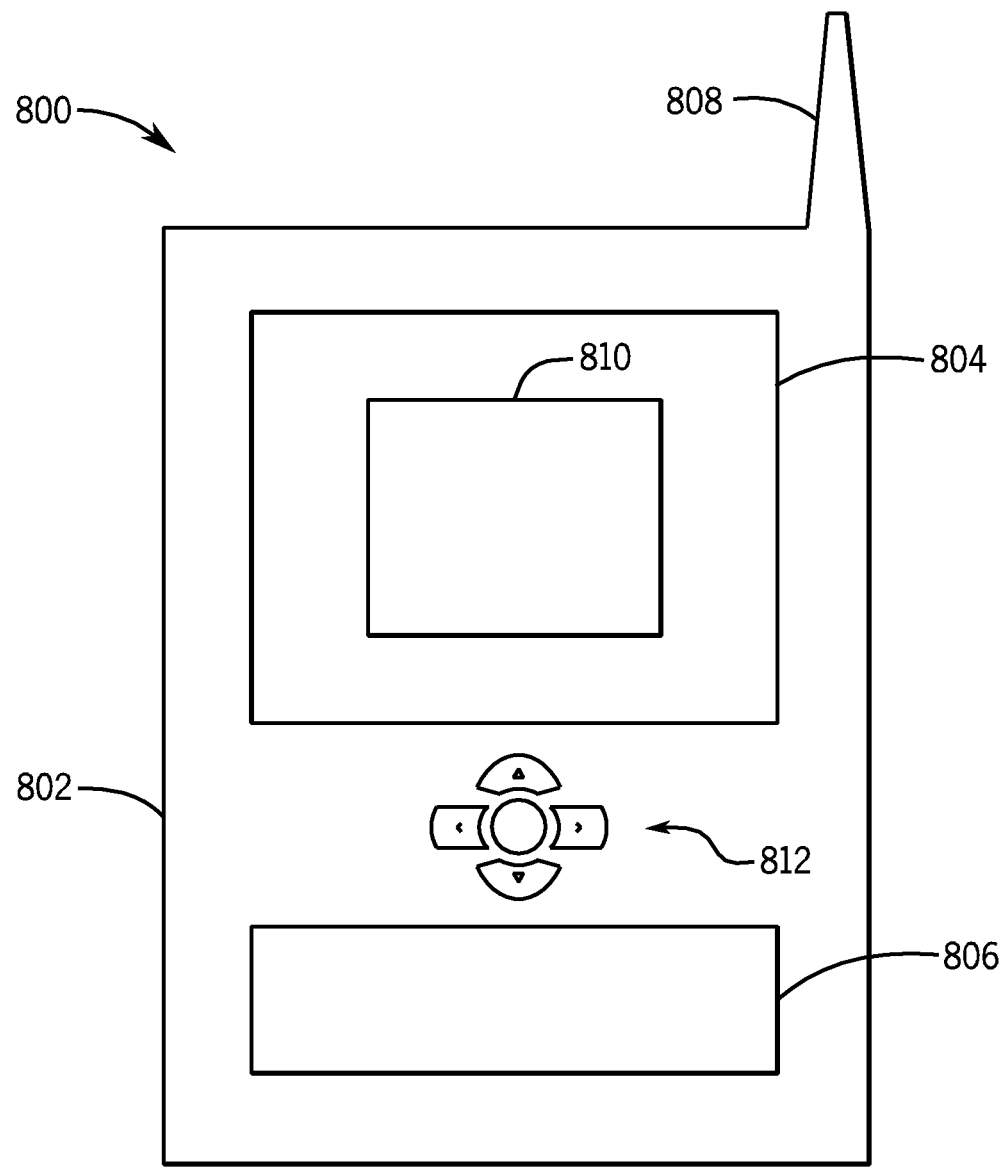
FIG. 5 is a front elevational view of a hand-held device according to one embodiment.

As described above, system 700 may be embodied in varying physical styles or form factors. FIG. 5 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIGS. 4, 5, and 6 in software and/or firmware embodiments.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

As described above, system 700 may be embodied in varying physical styles or form factors. FIG. 5 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 5, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
a hardware processor performing the steps of:
domain shading a first corner of a first patch;
domain shading a corner of a second patch only if that corner is not the first corner;
using separate caches for the corners and the edges;
flushing the edge cache each time it is used; and
flushing corners from the corner cache after being reused a predetermined number of times based on the shape of a patch, and specifically flushing each corner of rectangular patches after reusing a rectangular patch corner three times and flushing each corner of triangular patches after reusing a triangular patch corner five times.

2. The method of claim 1 including storing an indication of which corners have already been domain shaded in a cache.

3. The method of claim 1 including hull shading a given patch by adding a new corner to said patch.

4. The method of claim 3 including forming a new corner in the center of a patch and defining a set of four triangles each having the same corner within said patch.

5. The method of claim 4 including automatically determining a unique identifier for said new corner.

6. A non-transitory computer readable medium storing instructions to enable a processor to perform a method comprising:
domain shading a first corner of a first patch;
domain shading a corner of a second patch only if that corner is not the first corner;
using separate caches for the corners and the edges;

flushing the edge cache each time it is used;

flushing corners from the corner cache after being reused a predetermined number of times based on the shape of a patch, and specifically flushing each corner of rectangular patches after reusing a rectangular patch corner three times and flushing each corner of triangular patches after reusing a triangular patch corner five times.

7. The medium of claim 6 including storing an indication of which corners have already been domain shaded in a cache.

8. The medium of claim 6 including hull shading a given patch by adding a new corner to said patch.

9. The medium of claim 8 including forming a new corner in the center of a patch and defining a set of four triangles each having the same corner within said patch.

10. The medium of claim 9 including automatically determining a unique identifier for said new corner.

11. An apparatus comprising:

a processor to domain shade a first corner of a first patch, domain shade a corner of a second patch only if that corner is not the first corner;

a cache for corners;

a separate cache for edges;

said processor to flush the edge cache each time it is used; and said processor to flush corners from the corner cache after being reused a predetermined number of times based on the shape of a patch, and specifically flushing each corner of rectangular patches after reusing a rectangular patch corner three times and flushing each corner of triangular patches after reusing a triangular patch corner five times.

12. The apparatus of claim 11, said processor to store an indication of which corners have already been domain shaded in a cache.

13. The apparatus of claim 11, said processor to hull shade a given patch by adding a new corner to said patch.

14. The apparatus of claim 13, said processor to form a new corner in the center of a patch and define a set of four triangles each having the same corner within said patch.

15. The apparatus of claim 14, said processor to automatically determine a unique identifier for said new corner.

* * * * *